United States Patent
Tahkokallio et al.

(10) Patent No.: US 10,786,734 B2
(45) Date of Patent: Sep. 29, 2020

(54) METHOD FOR FACILITATING USER INTERACTIONS IN GAMING ENVIRONMENT

(71) Applicant: Supercell Oy, Helsinki (FI)

(72) Inventors: Touko Tahkokallio, Espoo (FI); Tristan Williams, Espoo (FI)

(73) Assignee: Supercell Oy, Helsinki (FI)

( * ) Notice: Subject to any disclaimer, the term of this patent is extended or adjusted under 35 U.S.C. 154(b) by 114 days.

(21) Appl. No.: 16/280,466

(22) Filed: Feb. 20, 2019

(65) Prior Publication Data

US 2020/0261797 A1    Aug. 20, 2020

(51) Int. Cl.

| | |
|---|---|
| *A63F 13/42* | (2014.01) |
| *G06F 3/0481* | (2013.01) |
| *G06F 3/0482* | (2013.01) |
| *A63F 13/25* | (2014.01) |
| *A63F 13/426* | (2014.01) |
| *A63F 13/56* | (2014.01) |
| *A63F 13/69* | (2014.01) |
| *A63F 13/44* | (2014.01) |

(Continued)

(52) U.S. Cl.
CPC .............. *A63F 13/42* (2014.09); *A63F 13/25* (2014.09); *A63F 13/426* (2014.09); *A63F 13/44* (2014.09); *A63F 13/52* (2014.09); *A63F 13/56* (2014.09); *A63F 13/67* (2014.09); *A63F 13/69* (2014.09); *G06F 3/0482* (2013.01); *G06F 3/04812* (2013.01)

(58) Field of Classification Search
None
See application file for complete search history.

(56) References Cited

U.S. PATENT DOCUMENTS

2004/0046800 A1    3/2004  Emerson
2006/0168548 A1*   7/2006  Kelley ................ G06F 3/04842
                                                          715/857

(Continued)

FOREIGN PATENT DOCUMENTS

| GB | 2501145 A | 10/2013 |
|---|---|---|
| KR | 101940701 B1 | 1/2019 |

OTHER PUBLICATIONS

Notification of Transmittal of the International Search Report and the Written Opinion of the International Searching authority, or the Declaration, Application No. PCT/FI2020/050082, dated Apr. 28, 2020, 14 Pages.

*Primary Examiner* — Jason T Yen
(74) *Attorney, Agent, or Firm* — Ziegler IP Law Group, LLC

(57) ABSTRACT

Disclosed is a method for facilitating user interactions. The method includes detecting a selection by a pointer device of a first character; detecting a movement of the pointer device towards a target object; presenting an indicator; detecting that the pointer device is within a predetermined distance of the target object; determining whether a job to be executed with respect to the target object is capable of being executed by the first character; highlighting the target object when the pointer device is within the predetermined distance and the first character is capable of executing the job; assigning the first character to the target object; causing the first character to execute the job with respect to the target object; and updating a presentation of the target object to present a result of the executed job.

20 Claims, 11 Drawing Sheets

(51) Int. Cl.
*A63F 13/67* (2014.01)
*A63F 13/52* (2014.01)

(56) References Cited

U.S. PATENT DOCUMENTS

| | | | |
|---|---|---|---|
| 2011/0250966 A1* | 10/2011 | Ohara | A63F 13/5375 |
| | | | 463/36 |
| 2012/0229516 A1* | 9/2012 | Matsunaga | A63F 13/5258 |
| | | | 345/659 |
| 2013/0130791 A1 | 5/2013 | Myogan | |
| 2016/0263481 A1* | 9/2016 | Yamagami | A63F 13/69 |
| 2017/0291108 A1* | 10/2017 | Kim | A63F 13/332 |
| 2017/0361230 A1* | 12/2017 | Tang | A63F 13/58 |
| 2018/0353849 A1* | 12/2018 | Tahkokallio | A63F 13/2145 |

* cited by examiner

METHOD FOR FACILITATING USER INTERACTIONS IN GAMING ENVIRONMENT

TECHNICAL FIELD

The present disclosure relates generally to a gaming environment, and more specifically, to a method for facilitating user interactions in a graphical user interface of a gaming environment. Moreover, the present disclosure relates to a computing device for facilitating user interactions in a graphical user interface of a gaming environment. Furthermore, the present disclosure also relates to software products stored on non-transitory (non-transient) machine-readable data storage media, wherein the software products are executable upon computing hardware of a computing device to implement the aforesaid methods.

BACKGROUND

In recent years, the use of electronic devices, such as smartphones, tablets, etc., for the purpose of entertainment has gained popularity. One of the implementations of the electronic devices for entertainment is their use as gaming systems for mobile gaming. An important aspect of any gaming system implemented on an electronic device is an ease with which a user can interact with a user interface of a game to control various operations of the game. Most of these electronic devices incorporate touch-sensitive display screens, and the gaming applications can be controlled through such touch sensitive operations on such displays.

Typically, strategy games have an object (like a character) that is controlled to complete various objectives or jobs of the game such as collect rewards, build various structures and so forth. Conventionally, a particular character is allocated to perform a certain job, or in some cases a task, for a particular target. In such gaming systems, a common way to allocate a particular character to a particular job is to first select the character and then select a target for which the job needs to be performed, so that the character relocates to the selected target to perform the allocated job. This may also, sometimes, require the user to provide more inputs if the desired target is not rendered on the display, for example to drag and move game area on the display. Such approach requires the user to click or tap the user interface multiple times which may be a bit cumbersome in some occasions especially in mobile gaming.

Furthermore, some game plays require that certain character can only be allocated to perform certain jobs related to the provided targets. Therefore, the user, after selecting the character, generally has to check whether the selected character can perform a desired job related to the target by trial and error approach, i.e. by subsequently selecting the target and waiting to see if there is any response; and in case it turns out that there is no response (e.g., when the character is not eligible to perform the desired job), that would result in wasted effort which could be frustrating for the user. Such user interactions are generally legacy of desktop gaming which involve use of mouse or joystick that only allows to click on an object in order to select that object, and thus may not be suitable for touch interactions based mobile gaming.

Another problem associated with graphical user interface pertaining to current gaming systems is the occasional ambiguous association of a particular character with a desired job associated with a particular location. In the conventional scenarios involving selecting the character and then the target, the character might get moved to an undesired location thereby disrupting the gaming experience altogether. Furthermore, the conventional methods do not provide freedom to the user to move the character from one job to the other task while the job is in progress. In other words, the conventional methods suffer from non-flexibility related to re-location of the characters or re-allocation of tasks to the different characters. This might lead to an unintuitive gaming experience for the user.

Furthermore, another problem associated with graphical user interface pertaining to current gaming systems is that the development of a character or target object from one level to other level is timeline driven, thereby leading to situations where lots of different timing parameters associated with different characters and target objects must be stored and maintained. This might lead to unexpected behaviour in a game which in turn leads to a bad user experience. For example, maintaining timings for jobs associated with different target objects and different level upgrades might lead to errors which can cause the game and/or game server to crash. Moreover, in a multiuser mode, different timings might lead to conflicts, particularly if multiple users are contributing to a same job at a same period of time.

Therefore, in light of the foregoing discussion, there exists a need to overcome the aforementioned drawbacks and provide a better graphical user interface for a gaming system which facilitates user interactions in a gaming environment.

SUMMARY

The present disclosure provides a method to facilitate user interactions with a graphical user interface while playing a game on a computing device. The present disclosure seeks to provide more intuitive user interactions associated with gaming on devices having a touch sensitive user interface. Specifically, the present disclosure provides a method that facilitates user interactions by providing an improved user experience, by sensing and obtaining user inputs through touching or swiping operations performed on a graphical user interface. An aim of the present disclosure is to provide a solution that overcomes at least partially the problems encountered in prior art, and provides simple and intuitive user interaction for game environment, thereby enabling an enjoyable gaming experience.

In one aspect, an embodiment of the present disclosure provides a computer implemented method, comprising:
  detecting a selection by a pointer device of a first character on a display of a computing device;
  detecting a movement of the pointer device on the display towards a target object on the display while maintaining the selection of the first character;
  presenting an indicator on the display while the pointer device is in a selecting state and moved or being moved, an origin of the indicator being disposed at an initial location of the first character on the display and extending toward an end, the end of the indicator corresponding to an end of the movement of the first character or a current position of the first character on the display, the indicator comprising a directional shape, wherein the directional shape is configured to follow the pointer device as it is moved from the initial position on the display;
  detecting that the pointer device is within a predetermined distance of the target object;
  determining whether a job to be executed with respect to the target object is capable of being executed by the first character;

highlighting the target object on the display when the pointer device is within the predetermined distance and the first character is capable of executing the job;

assigning the first character to the target object when the selecting by the pointer device is released and the pointer device is within the predetermined distance;

causing the first character to execute the job with respect to the target object; and updating a presentation of the target object on the display to present a result of the executed job.

In another aspect, an embodiment of the present disclosure provides a computing device comprising:

a display; and a computing hardware operable to execute a software product, wherein executing the software product results in generating and rendering a graphical user interface on the display, the graphical user interface being configured to facilitate user interactions, the computing hardware, the software product and the graphical user interface being implemented in a gaming environment to:

detect a selection by a pointer device of a first character on the display;

detect a movement of the pointer device on the display towards a target object on the display while maintaining the selection of the first character;

present an indicator on the display while the pointer device is in a selecting state and being moved, an origin of the indicator being disposed at an initial location of the first character on the display and extending toward an end of the movement or a current position of the first character on the display, the end of the indicator comprising a directional shape, wherein the directional shape is configured to follow the pointer device as it is moved from the initial position on the display;

detect that the pointer device is within a predetermined distance of the target object;

determine whether a job to be executed with respect to the target object is capable of being executed by the first character;

highlight the target object on the display when the pointer device is within the predetermined distance and the first character is capable of executing the job;

assign the first character to the target object when the selecting by the pointer device is released and the pointer device is within the predetermined distance;

cause the first character to execute the job with respect to the target object; and update a presentation of the target object on the display to present a result of the executed job.

Embodiments of the present disclosure, substantially eliminate or at least partially address the aforementioned problems in the prior art, and provide a method for facilitating user interactions with a graphical user interface and controlling game play in a gaming environment.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
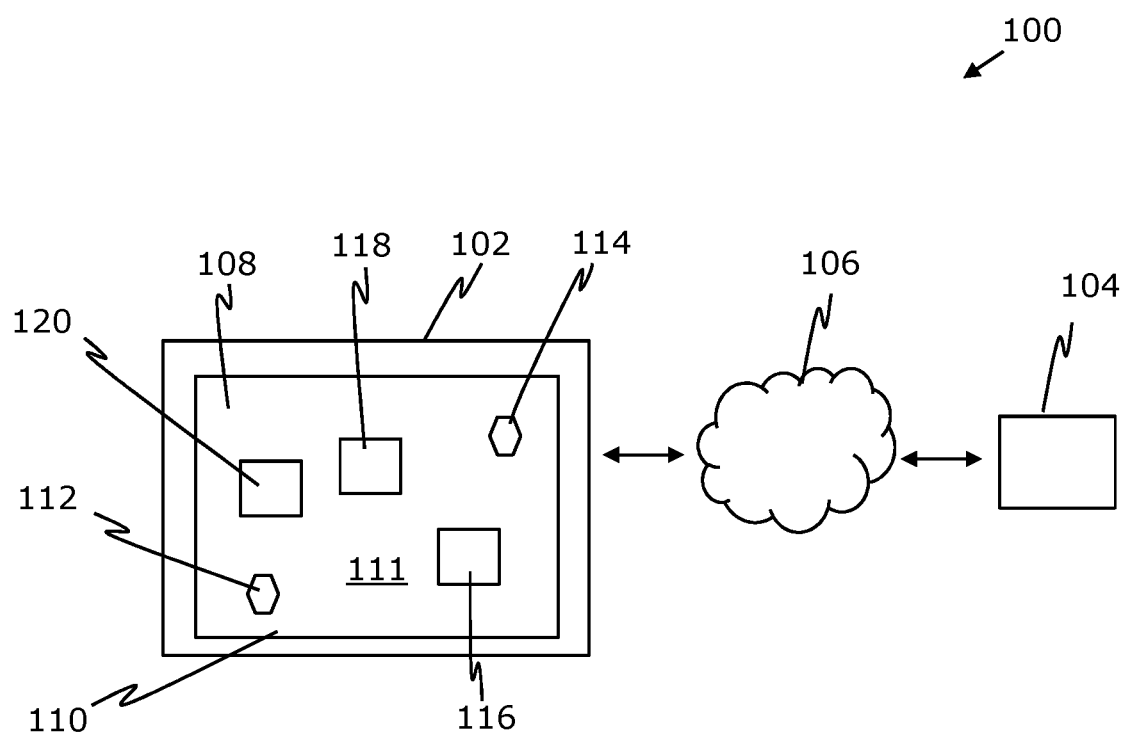
FIG. 1 is a schematic illustration of a block diagram of a system for facilitating user interactions in a gaming environment, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description, illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a computer implemented method, comprising:

detecting a selection by a pointer device of a first character on a display of a computing device;

detecting a movement of the pointer device on the display towards a target object on the display while maintaining the selection of the first character;

presenting an indicator on the display while the pointer device is in a selecting state and being moved, an origin of the indicator being disposed at an initial location of the first character on the display and extending toward an end of the movement or a current position of the character, the end of the indicator comprising a directional shape, wherein the directional shape is configured to follow the pointer device as it is moved from the initial position on the display;

detecting that the pointer device is within a predetermined distance of the target object;

determining whether a job, or in some cases a task, to be executed with respect to the target object is capable of being executed by the first character;

highlighting the target object on the display when the pointer device is within the predetermined distance and the first character is capable of executing the job;

assigning the first character to the target object when the selecting by the pointer device is released and the pointer device is within the predetermined distance;

causing the first character to execute the job with respect to the target object; and updating a presentation of the target object on the display to present a result of the executed job.

In another aspect, an embodiment of the present disclosure provides a computing device comprising:

a display; and a computing hardware operable to execute a software product, wherein executing the software product results in generating and rendering a graphical user interface on the display, the graphical user interface being configured to facilitate user interactions, the computing hardware, the software product and the graphical user interface being implemented in a gaming environment to:

detect a selection by a pointer device of a first character on the display;

detect a movement of the pointer device on the display towards a target object on the display while maintaining the selection of the first character;

present an indicator on the display while the pointer device is in a selecting state and being moved, an origin of the indicator being disposed at an initial location of the first character on the display and extending toward an end of the movement or a current position of the character, the end of the indicator comprising a directional shape, wherein the directional shape is configured to follow the pointer device as it is moved from the initial position on the display;

detect that the pointer device is within a predetermined distance of the target object;

determine whether a job to be executed with respect to the target object is capable of being executed by the first character;

highlight the target object on the display when the pointer device is within the predetermined distance and the first character is capable of executing the job;

assign the first character to the target object when the selecting by the pointer device is released and the pointer device is within the predetermined distance;

cause the first character to execute the job with respect to the target object; and update a presentation of the target object on the display to present a result of the executed job.

The present disclosure provides a computing device for executing a gaming environment. The computing device comprises a display and a computing hardware. The computing hardware is operable to execute a software product, which results in generating and rendering a graphical user interface on the display. In the present disclosure, the computing device, along with its computing hardware, the software product and the graphical user interface, are implemented to execute the said method to facilitate user interactions in the gaming environment. Examples of the computing device include, but are not limited to, mobile phones, smart telephones, Mobile Internet Devices (MIDs), tablet computers, Ultra-Mobile Personal Computers (UMPCs), phablet computers, Personal Digital Assistants (PDAs), web pads, Personal Computers (PCs), Handheld PCs, laptop computers, desktop computers, Network-Attached Storage (NAS) devices, large-sized touch screens with embedded PCs, and interactive entertainment devices, such as game consoles, Television (TV) sets and Set-Top Boxes (STBs).

In some examples, the gaming environment incorporates a plurality of computing devices that are coupled in communication with a server via a communication network. The graphical user interfaces are generated temporally concurrently on displays of the plurality of computing devices, to facilitate interactions of a plurality of users with the graphical user interfaces. Beneficially, the graphical user interfaces generated on the plurality of computing devices are coordinated and synchronized through the server, and updated on the plurality of computing devices concurrently with time. Herein, the communication network can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, and Worldwide Interoperability for Microwave Access (WiMAX) networks. Additionally, or alternatively, the computing devices may use their own Bluetooth® network, and connect to a Bluetooth® server, to synchronize with other electronic devices. The network environment may be implemented in various ways, depending on various possible scenarios. In one example scenario, the network environment may be implemented by way of a spatially collocated arrangement of the server and the database. In another example scenario, the network environment may be implemented by way of a spatially distributed arrangement of the server and the database coupled mutually in communication via the communication network. In yet another example scenario, the server and the database may be implemented via cloud computing services.

In the present examples, the gaming environment can be one of an action game, a role-playing game (RPG), a strategy game, a shooting game, a puzzle game and the like. For the purpose of the present disclosure, the gaming environment is a strategy game. It will be appreciated that such gaming environment may include a game field that is rendered in the graphical user interface. In an embodiment, the gaming environment may incorporate multiple users, such that each user is provided with respective home areas in the game field. Further, the game field may include a common area which is accessible to all the users associated with the gaming environment. Herein, the users of the gaming environment can develop the common area commonly. Furthermore, the gaming environment may include one or more character objects, one or more target objects, one or more resource objects, one or more base objects, one or more storage objects, etc., which may be distributed throughout the game field as rendered in the graphical user interface. Generally, each of the users may be provided with at least one of each of the listed objects in their respective home areas for executing the game play. During the game play, the user generally controls the one or more character objects to interact with others of these listed objects to accomplish various tasks and achieve various goals required for progression of the game play.

Throughout the present disclosure, the term "character object" as used herein refers to an object which can be independently controlled in the game filed. The character object may be an animated character or an avatar in the game field that is controlled by a user of the computing device. The one or more character objects may include, but do not limit to, a graphical representation of a worker, a builder, a soldier or any other person or even an animal or fictional character controllable in the game. The character object may possess various capabilities that allow the character object to perform various jobs, tasks and actions that are used to accomplish a goal. In an example, the character object is able to perform various actions such as move from one location to the other, pick up and move objects from one location to another, retrieve resources. In further example, the chapter object is able to complete a job such as building and upgrading structures, and the like. In further example character object is able to perform a task such as building a part of a house. Generally, as the terms are used herein, a task can be an action or activity that is performed or completed as part of a job. Hereinafter, sometimes, the term "character" has been interchangeably used with the term "character object" without any limitations.

The term "target object" as used herein refers to an object in the game field onto which an action can be taken. The target object can be an existing building or an incomplete (or an under-construction) structure in the game field. Examples of the target object include, but are not limited to, a house, a library, a military installation, a building, a wall etc. Generally, the target object can be any form of infrastructure which may help the user to achieve some goals in the game play. Herein, a job with respect to the target object may involve upgrading an existing target object (such as, upgrading from a small library to a large library or upgrading a house from a one level to another level), constructing a new building (such as, using resources to build a new library), and so forth. The job is taken by the user and involves allocating one or more of the character objects towards the target object.

The term "resource object" as used herein refers to an object present in the game field from which the user can retrieve resources as required for undertaking a job related to the one or more target objects. Example of resources include, but not limited to, a piece of wood, a stone, a brick, etc. Herein, the resource object may be a forest (like a collection of trees) from which "wood" as a resource can be retrieved (action); which in turn can be used for undertaking job related to a target object (such as, constructing a building or the like). In the game play, the user can allocate one or more character objects towards the resource object to retrieve resources therefrom. Furthermore, some resource objects can provide a predetermined resource which can help the character object to execute a task related to a target object with increased speed in comparison to when the character object have not acquired the said predetermined resource.

The term "base object" as used herein refers to an object in the home area of the game field in which the corresponding user can send the one or more of its character objects periodically to rest in order to replenish at least some of energy lost while executing any of the allocated jobs, actions or task related to one or more target objects thereby.

The term "storage object" as used herein refers to an object in the home area of the game field in which the corresponding user can store the resources as retrieved from the one or more resource objects. The user can control one or more character objects that have been allocated to any of the resource objects (to retrieve resources) to transport one or more of the retrieved resources to the storage object for storage of the resource therein. The stored resource can be helpful in the game play, as the user can utilize the stored resource directly for use in execution of a corresponding task related to the target object, without the need of retrieving or collecting the resource beforehand therefor.

In an embodiment, the character objects are characterized by a skill level of each of the character object. The skill level of each of the character object is a measure of efficiency of the character object. In an example, the first character object can have a first skill level and a second character object can have a second skill level. Notably, the skill level is a function of how efficiently each of the character objects can perform a task (or sequence of tasks) of a job towards a target object. For example, a first character with higher skill level may be able to perform a single task related to a job for a target object in a first period of time and a second character object with relatively lower skill level may be able to perform the same task related to a job for the target object with a second period of time, where the first period of time is shorter than the second period of time due to the variation in the skill levels of the corresponding character objects.

In one embodiment, a character object can improve their current skill level to another skill level. For example, if the character object obtains or is assigned a resource, such as a tool, that allows the task or job to be completed more efficiently or faster, the skill level can improve. For example, if the character object is cutting woods, obtaining a power saw in place of a hand saw, can improve the skill level. Similarly, if the character object obtains a resource that causes the character object to perform a task less efficiently, or slower, the assigned or current skill level can be downgraded.

In some implementations, the user interface may also provide a first character indicator which displays information pertaining to the first character. The information comprises one or more of a name of the first character, an energy level of the first character, a skill level of the first character and information about predetermined resources (such as, tools) possessed by the first character.

Additionally, the game field may also comprise one or more obstacles, such as walls, to restrict movement of the one or more objects to specific areas within the game field. Optionally, the game field comprises one or more elements, such as stars, health pick-ups or ammunition pick-ups, to provide assistance to the user and/or increase a score associated with performance of the player. Moreover, the user interface may also present one or more indicators to provide information to the player, such as information associated with a score of the game or health of the objects. In some examples, the graphical objects are represented by different shapes and/or different colours. In other examples, the graphical objects are represented by different symbols, for example, such as different alphabets.

In some examples, the user interface also comprises various signs, such as a first sign displaying a name of the active user, a second sign displaying a number of resources available with a selected character object at a given instant of time, a third sign displaying a number of energy refills units available for use, a fourth sign displaying a number of rewards collected by the character object, etc. Furthermore, the user interface comprises various icons, such as a first icon to aid the user to navigate the character object in the game field, a second icon to present a chat box to the active user for enabling the active user to interact with various other users in the gaming environment, a third icon to select one of the available predetermined resource for the character object and the like.

The present computer implemented method comprises detecting a selection by a pointer device of a first character on the display of the computing device. In the gaming environment, the user may select the first character to subsequently make the first character undertake a certain job or action or task, related to the game play. In one or more examples, when the user selects the first character, the first character, as rendered in the graphical user interface on the display, may get highlighted, for example by forming a light ring around the first character, or making the first character relatively larger or brighter as compared to other character objects in the game field, or the like.

For making a selection, a user of the computing device employs the pointer device, e.g., one or more of his/her fingers (or a stylus) and performs touching operations at one or more locations in the graphical user interface as rendered on the display. Herein, the display is an input-output device configured to detect an input corresponding to clicking, tapping and swiping movement of the pointer device over thereof. In one or more examples, the display is a multi-touch sensitive screen, capable of sensing touching or swiping operations performed at multiple points on the screen simultaneously. Furthermore, instead of using fingers, the swiping operation can also be performed through a mouse, by pointing and tapping the mouse initially at a point on the display, dragging the pointer on the screen along the desired path, through the mouse, and finally releasing the mouse at the final position. Additionally, any other display sensitive device or an organ, e.g., a pen or any substantially pointed article, can be used as a pointer device for performing the touching or the swiping operation on the display.

For the purposes of the present disclosure, the display is a touch-sensitive display; however, it will be appreciated by a person skilled in the art that the disclosed embodiments can be implemented on other display types with suitable input devices without any limitations. Optionally, the touch-sensitive display is configured to sense a pressure applied by the pointer device, including finger or any other touch-sensitive object. In one example, the touch-sensitive display may be a capacitive touch screen that is operable to detect changes in capacitance. In another example, the touch-sensitive display may be a resistive touch screen that is operable to detect changes in resistance. In yet another example, the touch-sensitive display is an optical touch screen that is operable to detect changes in reflectivity.

The present computer implemented method further comprises detecting a movement of the pointer device on the display towards a target object on the display while maintaining the selection of the first character. That is, upon detecting the inputs by the user, the software product, when executed on the computing hardware, is configured to identify a gesture related to the inputs by the pointer device on the graphical user interface as provided by the user. The gesture may take into account at least one of: a force applied by the user, a pressure applied by the user, a speed with which the pointer device was moved, a duration for which the gesture was applied, and/or a position on the touch-sensitive display screen where the gesture was applied. Consequently, the software product, when executed on the computing hardware, is configured to analyse the gesture, and to apply an appropriate action corresponding to the gesture. In the present examples, the graphical user interface senses the touching or swiping operation, and the software product corresponding to the game, executes actions pertaining to the performed touching operation on different objects in the graphical user interface.

The present computer implemented method further comprises presenting an indicator on the display while the pointer device is in a selecting state and being moved, an origin of the indicator being disposed at an initial location of the first character on the display and extending toward an end of the character movement or a current position of the character on the display, the end of the indicator comprising a directional shape, wherein the directional shape is configured to follow the pointer device as it is moved from the initial position on the display. Herein, the indicator is rendered in real-time in the graphical user interface on the display in the form of an arrow with its tail being at an initial point in the game field where the first character was located when the same was selected by the pointer device and the arrow head being at an end point in the game field where the pointer device is moved to, while in contact with and not released from the display. The arrow head generally points in a direction of movement of the pointer device from the initial point to the end point. The rendered indicator provides a useful visual reference for the user indicating an action that has been taken by the user for moving the first character from one location to another location in the game field.

The present computer implemented method further comprises detecting that the pointer device is within a predetermined distance of the target object. For this purpose, the computing hardware may determine a distance (like pixel distance corresponding to particular zoom level of the game field) of the end point of the indicator from all of the target objects in the game field as rendered in the graphical user interface, and identify target objects that are within the predetermined distance (i.e. the target objects for which the distance between the end point and thereof is less than the predetermined distance). Herein, the predetermined distance may be a threshold distance for selecting target objects for which action can be taken based on the selection of the first character and the gesture of the user in the graphical user interface on the display.

The present computer implemented method further comprises determining whether a job to be executed with respect to the target object is capable of being executed by the first character. As discussed, each of the character objects is capable of performing one or more particular jobs related to one or more of target objects. For instance, the first character may be a "worker"; and in such case, the first character may be capable of executing wood-work related to any of the target objects for construction or upgradation thereof; however, the same first character may not be capable of executing military work, such as attacking a target object like an enemy post, for which the first character may need to be "soldier" or the like or the same first character may not be capable of executing farming work, such as harvesting wheat or fishing.

The present computer implemented method further comprises highlighting the target object on the display when the pointer device is within the predetermined distance and the first character is capable of executing the job. That is, if it is determined that the selected first character is capable of executing given job for at least one target object from multiple target objects present within range of the predetermined distance from the end point of the indicator, then that at least one target object is highlighted so as to provide a visual indicator to the user that the selected first character can be employed for performing given job for that particular at least one target object. This feature eliminates the need of the trial and error on the part of the user to individually check multiple target object to determine whether the selected first character is capable of executing any job related to that target object. It will be appreciated that this feature provides a more intuitive game play for the user as compared to the conventional user interfaces which require user to check multiple objects by clicking or tapping on one or more of those objects to possibly find that the selected character is not capable of executing any job related to that object, which in turn could be a frustrating experience for the user.

The present computer implemented method further comprises assigning the first character to the target object when the selecting by the pointer device is released and the pointer device is within the predetermined distance. In the present implementation, when the desired executable target object has been highlighted, the user may choose to simply release the pointer device from contacting the display and the target object is selected automatically. In case, two or more target objects are executable by the selected first character and are being highlighted, then the user may further extend the pointer device (from the end point) towards a desired target object (for which action is desired to be taken) of the two or more highlighted target objects such that now only the desired target object is within the predetermined distance and is being highlighted (and other of the two previously highlighted target objects is no longer highlighted), and then the user may release the pointer device to assign the first character to the desired target object. It may be appreciated that the present disclosure allows the user to take an action pertaining to movement of the first character from one location to another location in the game field by more intuitive swipe gesture, rather than by employing multiple clicks or taps on the display (i.e. first tapping at the initial point, and subsequently tapping at the end point) which is cumbersome and unintuitive.

The present computer implemented method further comprises causing the first character to execute the job with respect to the target object. That is, once assigned the first character initiate the given job related to the target object. For instance, if the selected first character is a "worker" and the assigned target object is a library, then the first character may complete work related to, say, upgrading of the library.

The present computer implemented method further comprises updating a presentation of the target object on the display to present a result of the executed job. For instance, in case of the assigned job to the first character is to upgrade the target object; thus when the assigned job has been executed by the first character, then presentation of the target object is updated, for example by re-rendering an increase in a size of the target object in the graphical user interface on the display, such as from previously small in size to now comparatively large in size.

Optionally, assigning the first character to execute the action comprises causing the first character to reposition from the initial location to a position near the target object. Repositioning of the first character from the initial location to a position near the target object displayed at a second spatial position on the graphical user interface is configured to result in changing the spatial position of the first character from the first spatial position (i.e. initial location) to the second spatial position (i.e. near the location of the target object). In other words, when the first character is assigned a task related to a target object, then the first character may move from its initial location to a location near the target object.

Optionally, causing the first character to execute the action further comprises causing the first character to reposition from the target object to a resource object, the resource object being configured to provide resources for the first character to execute at least one task of the job at the target object. For example, in case the first character is assigned a job of upgrading a target object, like a library, and the assigned job required a resource like wood; thus when the first character may have exhausted available wood resources, then for continuing the assigned job, the game play may require that the first character finds more wood resources. Accordingly, the first character is made to switch from the job of upgrading the target object to a job (or action) of retrieving wood resources by assigning the first character to the resource object like the forest. Therefore, the aspects of the disclosed embodiments are configured to reposition the first character from the target object to the appropriate resource object for retrieving the needed resource.

Optionally, the computer implemented method further comprises causing the first character to retrieve at least one resource related to the job from the resource object and transport the at least one resource from the resource object to the target object. For instance, in the above described situation, after the wood resources have been retrieved, the first character may relocate itself from the resource object (forest) back to the target object (library) to transport the retrieved wood resources thereto in order to be used thereby for continuing the assigned task of upgrading the target object using the retrieved wood resources.

Optionally, the computer implemented method further comprises causing the first character to execute at least a portion of the job with respect to the target object with the at least one resource. For instance, in the above described situation, the first character utilizes the retrieved wood resources to complete at least as much of the task of upgrading the library as possible with the retrieved wood resources.

Optionally, the computer implemented method further comprises causing the first character to return to the resource object to retrieve at least one other resource from the resource object if the job to be executed is not complete. For instance, in the above described situation, if the job of upgrading of the library is still not complete with the previously retrieved wood resources, further wood resources are needed for its completion, the first character is made to return back to the resource object (in this case, the forest) to retrieve more wood resources. It may be appreciated that the cycle of returning back to the resource object to retrieve more resources may continue in loop till the assigned job related to the target object is completed.

Optionally, the computer implemented method further comprises causing the first character to relocate to a base object periodically from the target object while executing the job. As discussed, the base object is a place where the first character can be relocated to rest in order to replenish at least some of the energy lost while executing any of the allocated tasks related to the target object thereby. As discussed, the graphical user interface provides a first character indicator which displays information pertaining to the first character. The information comprises one or more of a name of the first character, an energy level of the first character, a skill level of the first character, information about predetermined resources (such as, tools) possessed by the first character, and the like. The user may check for energy level of the first character and if finds that the energy level may not be sufficient to carry on with the assigned task, then the user may choose to relocate the first character from the target object to the base object to replenish the energy level thereof. In some examples, if the energy level falls below a predefined threshold, the first character may automatically be relocated from the target object to the base object.

Optionally, the computer implemented method further comprises presenting a timer device on the display, the timer device being configured to present an elapsed time of execution of the job. In an embodiment, the timer device may be rendered proximal to the first character indicator related to the first character. In an implementation, as soon as the user assigns a job related to a target object to the first character, the corresponding timer device starts a clock in order for the user to check for time taken for the job being executed. The timer device facilitates the user to better plan for time allocation for various jobs in the game play. Alternatively the timer device on the display can be configured to present an indication of how much of the job has been done/completed i.e. for example how much of the job is done or is still pending.

Optionally, the job comprises a predetermined number of tasks, and wherein a single task of the predetermined number of tasks is configured to require a predetermined amount of time. For example, a job of upgrading of a target object may be defined as one job which in turn may involve one or more tasks to be performed for its completion. In the present implementation, each of the tasks may be defined to require a predetermined amount of time (in consideration of a skill level of the first character), such that the total time period needed for completion of the job related to the target object is a sum of time periods needed for executing each of the individual tasks. Further, in some implementations, each of target object level is assigned a project definition. The project definition defines an amount of resources needed to complete, for example, upgrading of the target object from a current level to a next level thereof i.e project definition defines parameters and constrains for completing a job. As an example, upgrading of a house (as a target object) from a first level to a second level may require 50 resources of wood. Therefore, the assigned job related to the target object can only be completed once the required number of resources are available, either at one instant of time or in parts. This approach provides a time scale as each character object has a rate at which it needs to perform a single task related to a target object using a resource. This way the rate at which each job is performed can be controlled by controlling the rate execution of a single task. Also this way it is possible to have two or more character objects to contribute to a job involving multiple tasks for a target object, without the risk of time conflicts. In a further example a job comprises for example 20 tasks of a first type. In this example task of the first type is repeated 20 times in a row to complete the job. A first character object might have a first skill (character object definition parameter) level to complete one of the first type of tasks in 2 seconds. Thus time to complete the job is 20×2 sec=40 sec. A second character object might have a second skill level to complete one of the first type of tasks in 1 second. Thus time to complete the job is 20×1 sec=20 sec for the second character object. If both character objects are allocated to the job the time to complete the job is 7 seconds. The first character object is able to do in said time 14 tasks of the first type and the second character object 7 tasks of the first type. The embodiment also enables to control timing of completing any other job type such as harvesting resources (such as fishing, cutting wood, harvesting wheat). As an example fishing of 20 kg of fish might require capturing 10 (task) fish each fish being 2 kg. A character object skill level might be to be able to capture one fish per minute. Thus the character object could complete the job of fishing 20 kg of fish in 10 minutes. The embodiment also gives flexibility for user to allocate character objects in more meaningful way thus making experience more pleasant. This embodiment of splitting each job to tasks enables to control timing of target level object upgrades in a manner which is less borne to errors than allocating separate timers each job. Embodiment of allocating timers as task based (and skill level/character object based) is more flexible way of managing computer implemented method/device than allocating timers to each job.

Optionally, the first character has a predefined skill level, the predefined skill level defining a first time required for the first character to complete a task of the job. That is, each of the character objects, including the first character, is defined to have a certain skill level, and the amount of time taken by the character object to compete a given task is based on the skill level thereof. In some examples, the skill level of a particular character object may be defined for each of the different categories or types of tasks that may possibly be required to be executed by the character object at any stage of the game play. It may be appreciated that a character object with a higher skill level would be able to complete a given task faster than another character object with relatively lower skill level. Benefit of this approach is further to enable more flexible ways to control timings related to completing a task (thus timings related to completing a job or a project). In an embodiment character object definition module is used to maintain and update skill levels of each of the character objects on a task by task basis, and in some cases a resource by resource basis.

Optionally, the computer implemented method further comprises increasing a skill level of the first character, wherein increasing the skill level of the first character causes the first character to perform the task in a second time, the second time being less than the first time. In some implementations, the skill level of the first character may be increased by investing in learning of the first character which can be done by spending on learning resources, like coins; or by upgrading learning institutes like a library. Further, in some implementations, the skill level of the first character may automatically be increased over time once the first character has been involved in carrying out certain number of tasks during the game play. As a further example each character objects associated with a player might benefit of upgrading the learning institute like a library. The skill level of the character objects can be increased as the library is upgraded. The library can be configured to provide dedicated learning for different tasks. For example a learning level on how to complete a fishing task might be improved. The learning level can be optionally allocated to a one character object or to two or more character objects.

Optionally, the computer implemented method further comprises increasing a speed with which the first character is configured to execute the task when the first character acquires a predetermined resource from the resource object.

Herein, the predetermined resource may be a tool, such as an axe or a hammer, which may aid the first character in relatively faster execution of one or more tasks related to the target object; or an equipment, such as a fishing rod, which may aid the first character to retrieve resources relatively faster. The predetermined resource may be acquired from a resource object, like a tool repository, such that the tools may be unlocked based on the game play and/or if the user spends some resources, like coins, to purchase the said predetermined resource. Additionally/alternatively learning level/skill level can refer to capability of a character object to use such a resource. For example when upgrading a library a character objects might then be able to use a fishing net in addition to the fishing rod.

Optionally, the computer implemented method further comprises causing the first character to transport at least one item that is a result of a task to a storage object. For instance, the task may be related to retrieving one or more resources from a resource object. As discussed, if the first character has concurrently been assigned to a job related to a target object, then the retrieved resources may be utilized in completion of the job related to the target object if the retrieved resources are suitable for the purpose. However, otherwise, the retrieved resources from the resource object may be stored in the storage object, such as a warehouse, for later quick retrieval and usage as per the requirement.

Optionally, the computer implemented method further comprises causing the first character to retrieve an item from the storage object and transport the item to a second target object and causing the first character to execute an action on the second target object with the item, wherein a presentation of the second target object is updated on the display to reflect the executed action. That is, during the game play, if the first character is assigned a job related to the second target object which may require some items (including resources) already available and stored in the storage object (e.g., extra resources that may have not been utilized in execution of a task related to the first target object), then the first character may directly retrieve the available items from the storage object for executing the job related to the second target object, without the need of retrieving resources from a resource object. This reduces the amount of time needed for execution of job related to the second target object, thus increasing the competitive edge for the corresponding user in the game play.

Optionally, the computer implemented method further comprises detecting a selection by a pointer device of at least one other character on the display of the computing device; detecting a movement of the pointer device on the display towards the target object on the display while maintaining the selection of the at least one other character; presenting an indicator on the display while the pointer device is in the selecting state and being moved, an origin of the indicator being disposed at an initial location of the at least one other character on the display and extending toward an end of the movement or a current position of the character, the end of the indicator comprising a directional shape, wherein the directional shape is configured to follow the pointer device as it is moved from the initial location of the at least one other character on the display; detecting that the pointer device is within the predetermined distance from the target object; determining whether the at least one other character is capable of executing a task for the job related to the target object; highlighting the target object on the display when the pointer device is within the predetermined distance and the job is capable of being executed by the at least one other character; assigning the at least one other object to the target object when the selecting by the pointer device is released and the pointer device is within the predetermined distance; and causing the at least one other character to execute the job with respect to the target object. It may be appreciated that the listed user interactions herein for assigning a job related to a target object to the at least one other character are generally similar to the user interactions as described in the preceding paragraphs for assigning a job related to a target object to the first character. Further it may be appreciated that advantages associated the intuitive user interactions (as described in the preceding paragraphs) are also applicable for these types of user interactions in the game play.

Optionally, the task executed by the first character and the task executed by the at least one other character are cumulatively executed with respect to job associated with the target object. That is, if both the first character and the at least one other character have been assigned to execute corresponding tasks related to a same job towards a target object, then the corresponding executed tasks may be cumulatively added towards the progression of completion of the job for that target object. For example, assuming both the first character and the at least one other character are at same skill level, and generally if execution of all the tasks related to the job for the target object may take 'X' units of time when assigned to a single character object only, then in case of assignment of both the first character and the at least one other character may result in completion of the job in 'X/2' units of time.

Optionally, the task executed by the first character is different from the task executed by the at least one other character. That is, in the present implementations, it may be possible to assign different types of tasks related to a single job for a target object to different character objects without any limitations. This may particularly be resourceful in a situation where the first character and the at least one other character have different skill sets so that the two characters can be assigned different tasks based on their skill set for faster execution of the respective tasks.

Optionally, the first character is configured to execute and complete a first task or task type for the target object within a first predetermined time period and the at least one other character is configured to execute and complete a second task or task type for the target object within a second predetermined time period. In other words, if different types of tasks related to a single job for a target object are assigned to different character objects such as the first character and the at least one other character (for example), it may be possible that the first character may execute the corresponding task in different amount of time (faster or slower) as compared to an amount of time taken by the second character for completing its corresponding task.

Optionally, updating the presentation of the target object on the display to present a result of the executed job further comprises determining that a predetermined number of tasks of the job have been executed; and updating the presentation of the target object from a first level to a second level when the predetermined number of tasks are completed within a predetermined time period for the job. That is, for example, the software, as implemented on the computing hardware, may keep track of whether the predetermined number of tasks related to completion of the job related to a target object have been executed, and only if that is true may render the graphical user interface to update the presentation of the target object from the first level to the second level.

In an example game play, the user's object is to develop his home area (for example a town or village) from an initial status to a more developed status. The example game play can be co-operative play where the player receives benefits by helping other users to develop their home area as well. The players might gain benefits also by developing common areas. Two or more players developing their home areas might be configured to form a nation. There might be plurality of different nations throughout the game environment.

The home area (your town) is developed by upgrading target objects (houses for example) from a first level to a second level. As the game progresses the town will have more and more houses. Also number of character objects which the user can control can increase as the game advances.

The town in an example game has a library object. Upgrading the library object brings benefits to entire town. All or some of the skills which are being developed in the upgrading the library can be used by all or some of the character objects. This further helps user to develop the town faster. For example, when a character object completes a task, or part of a task, they can be determined to have experience in performing the task. Experience can be used to improve upon or increase skill level.

The town area might have resource objects such as forest which character objects can harvest. The town can have resources like a pumpkin field for the character objects of the home town to get food from (e.g energy). Some of the character objects might have a skill set of harvesting fields, while some might have skills related to fishing. The skill set can be based on an initial assigned skill set or a skill set that is developed by executing tasks in that regards. The character objects can be configured to have residence in their "own" houses and also perform some jobs autonomously.

One purpose of the game can be leisure, wherein the user of the game targets to spend time with the game and others playing the game. An example game might include possibility to interact with other users using a game terminal. In some embodiments the game can comprise payable items which can be used to help in developing the home area further. An example might be the purchase of extra skills, resources (tools) or boosting execution time of a task, etc.

One of the targets of the game can be to develop a nation comprising two or more home areas as an entity. Such an entity will have over time, for example, thousands of character objects, target objects and ongoing jobs. There may also be several nations in a game. Thus total number of objects and jobs in an overall game system can be millions or billions depending on number of users.

DETAILED DESCRIPTION OF THE DRAWINGS

Referring to FIG. 1, there is shown a schematic illustration of block diagram of a system 100, in accordance with an embodiment of the present disclosure. As illustrated, the system 100 comprises a computing device 102, a server arrangement 104 and a communication network 106. The computing device 102 is communicatively coupled to the server arrangement 104 via the communication network 106. As shown, the computing device 102 includes a display 108. The display 108 provides a user interface for rendering graphical elements, objects, game field and so forth. Notably, the display 108 is touch sensitive to receive a user-input from a selector 110. In the illustrated example, a game field 111 is displayed on the user interface of the computing device 102. The game field 111 comprises a first character object 112 and a second character object 114. The first character object 112 can be a first game character. The second character object 114 can be a second game character.

Furthermore, the game field 111 comprises one or more target objects such as a first target object 116, a second target object 118, and a third target object 120. Herein, the selector 110 is utilized by the user to move one or more character objects, including the first character object 112 and the second character object 114, to navigate the game field 111 so as to move towards one or more of the target objects as required.

Figure 2:
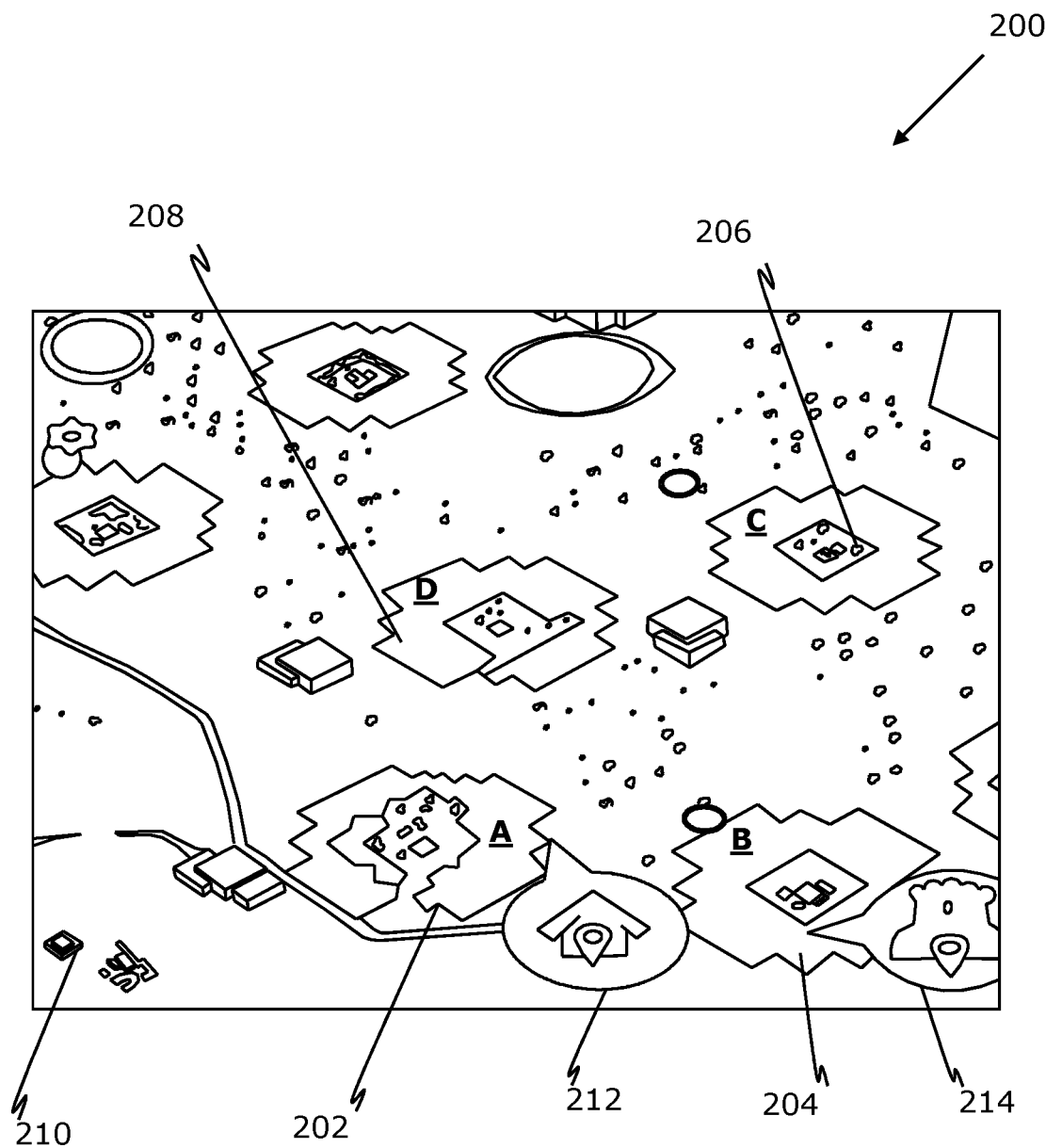
FIG. 2 is a graphical representation of a game field rendered on a display of a computing device, in accordance with an embodiment of the present disclosure.

Referring to FIG. 2, there is shown a graphical representation of a game field 200 as would be rendered in a graphical user interface on a display (such as the display 108 of FIG. 1) of a computing device (such as the computing device 102 of FIG. 1), in accordance with an embodiment of the present disclosure. Herein, the graphical user interface incorporates multiple users, namely A, B, C and D for game play. The rendered game field 200 comprises respective home areas associated with each of the user. For example, the first user A is in control of home area 202, the second user B is in control of home area 204, the third user C is in control of home area 206, and the fourth user D is in control of home area 208. Furthermore, the users A, B, C and D are associated with a common area 210. The common area 210 is accessible to each of the users A, B, C and D, and the users A, B, C and D can develop the common area 210 commonly. Further, the game field 200 comprises a first indicator 212 and a second indicator 214. Herein, the first indicator 212 is employed to indicate a direction of a home area for an active user (e.g., the home area 202 for the user A) and the second indicator 214 is employed to indicate a direction of the common area 210 for an active user. Alternatively, an active user can directly interact with the first indicator 212 to render the game field 200 with the respective home area and with the second indicator 214 to render the game field 200 with the common area. Notably, if the user A move the rendered game field 200 (e.g., by dragging or scrolling) to any of left, right, up or down directions, the indicators 212 and 214 also move accordingly to persistently indicate direction of the home area 202 and the common area 210 for the user A, even if the home area 202 and/or the common area 210 may not be visible in the rendered game field 200.

Figure 3:
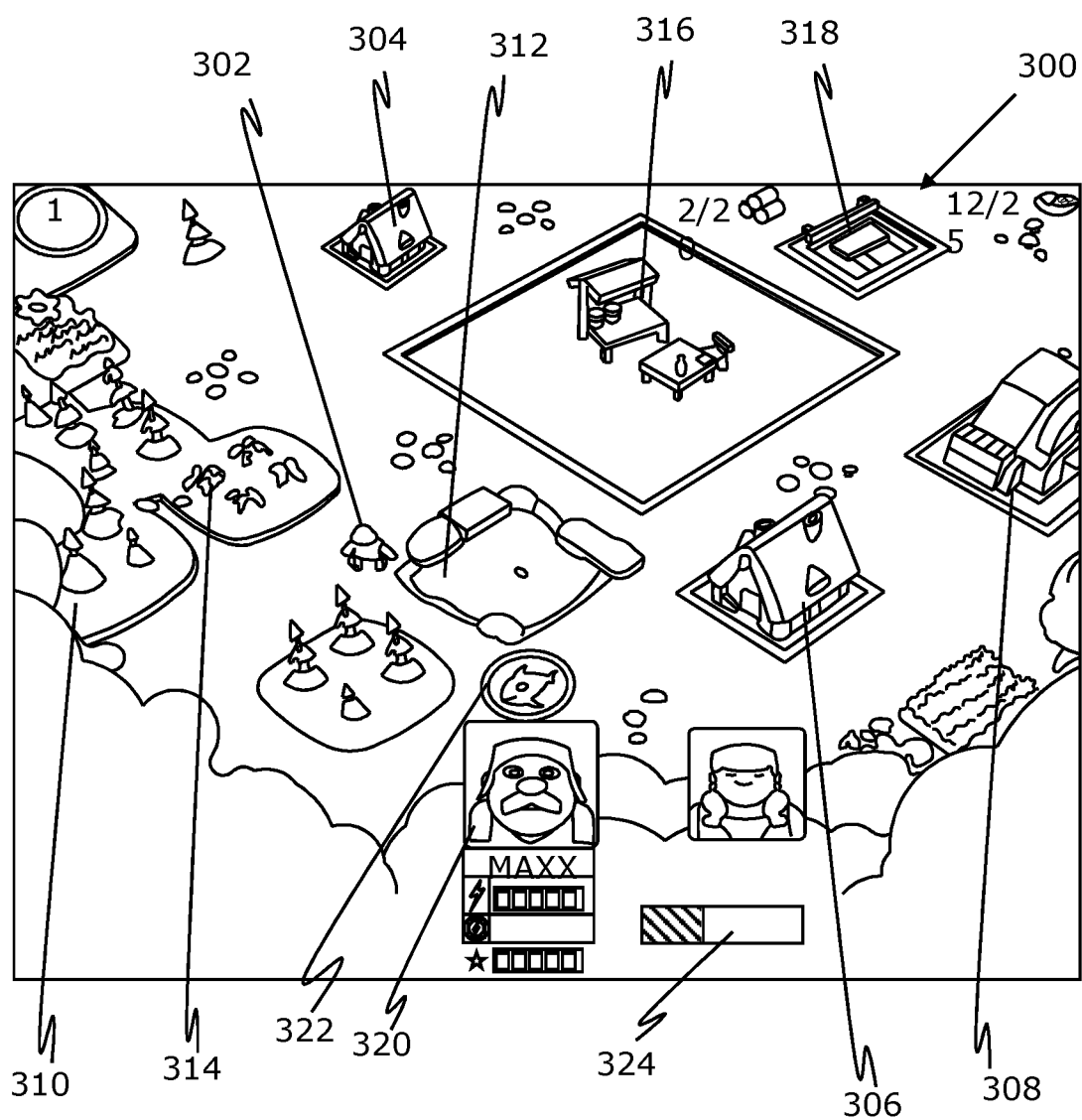
FIG. 3 is a graphical representation of a game field around a home area of an active user as rendered on the display of the computing device, in accordance with an embodiment of the present disclosure.

Referring to FIG. 3, there is shown a graphical representation of a game field 300 around a home area (such as, the home area 202) of an active user (like the user A) as would be rendered on a graphical user interface associated with a display (such as the display 108 of FIG. 1) of a computing device (such as the computing device 102 of FIG. 1), in accordance with an embodiment of the present disclosure. As illustrated, the game field 300 comprises a first character 302. Further, the game field 300 comprises multiple target objects such as a first target object 304 (a first house), a second target object 306 (a second house) and a third target object 308 (a library). Further, the game field 300 comprises multiple resource objects, such as a first resource object 310 (a forest with collection of trees), a second resource object 312 (a fish pond) and a third resource object 314 (a farm). Further, the game field 300 comprises a base object 316, such as a dining table. Further, the game field 300 comprises a storage object 318, such as a warehouse for wood storage.

Notably, the first character 302 can perform an action on one or more of the target objects 304, 306 and 308, the resource objects 310, 312 and 314, the base object 316 and the storage object 318 to perform one or more actions. Herein, the action related to the first target object 304 and the second target object 306 may include building or upgrading the respective house and the action related to the third target object 308 may include building or upgrading the library; the action related to the first resource object 310 may include cutting trees to extract wood resource, the action related to the second resource object 312 may include fishing to extract fish resource and the action related to the third resource object 314 may include farming to extract food resource; the action related to the base object 316 may include feeding the first character to replenish its energy; and the action related to the storage object 318 may include storing the extract resources for later use.

Further, as illustrated, the user interface comprises a first character indicator 320. The first character indicator 320 displays information pertaining to the first character 302. The information comprises one or more of a name of the first character 302 (namely, "MAXX"), an energy level of the first character 302, a skill level of the first character 302 and information about predetermined resources (such as, tools) possessed by the first character 302. In the illustrated example of FIG. 3, the first character 302 is shown performing an action around the second resource object 312 (i.e. the fish pond). Notably, the first character indicator 320 further displays information pertaining to current activity of the first character 302, for example by a sign, such as a fish sign 322 (as shown), depicting that the first character 302 is performing the action of fishing around the second resource object 312 (fish pond).

Furthermore, the user interface comprises a timer device 324 rendered on the display to present an elapsed time of execution of the job related to the current activity or action of the first character 302. In an example, the fishing action for retrieving one resource takes predetermined amount of time for the first character 302 such as 60 seconds. Herein, the timer device 324 is filled up to about one-third of the time device, thereby indicating that about 20 seconds have elapsed for the fishing activity by the first character 302.

Figure 4A:
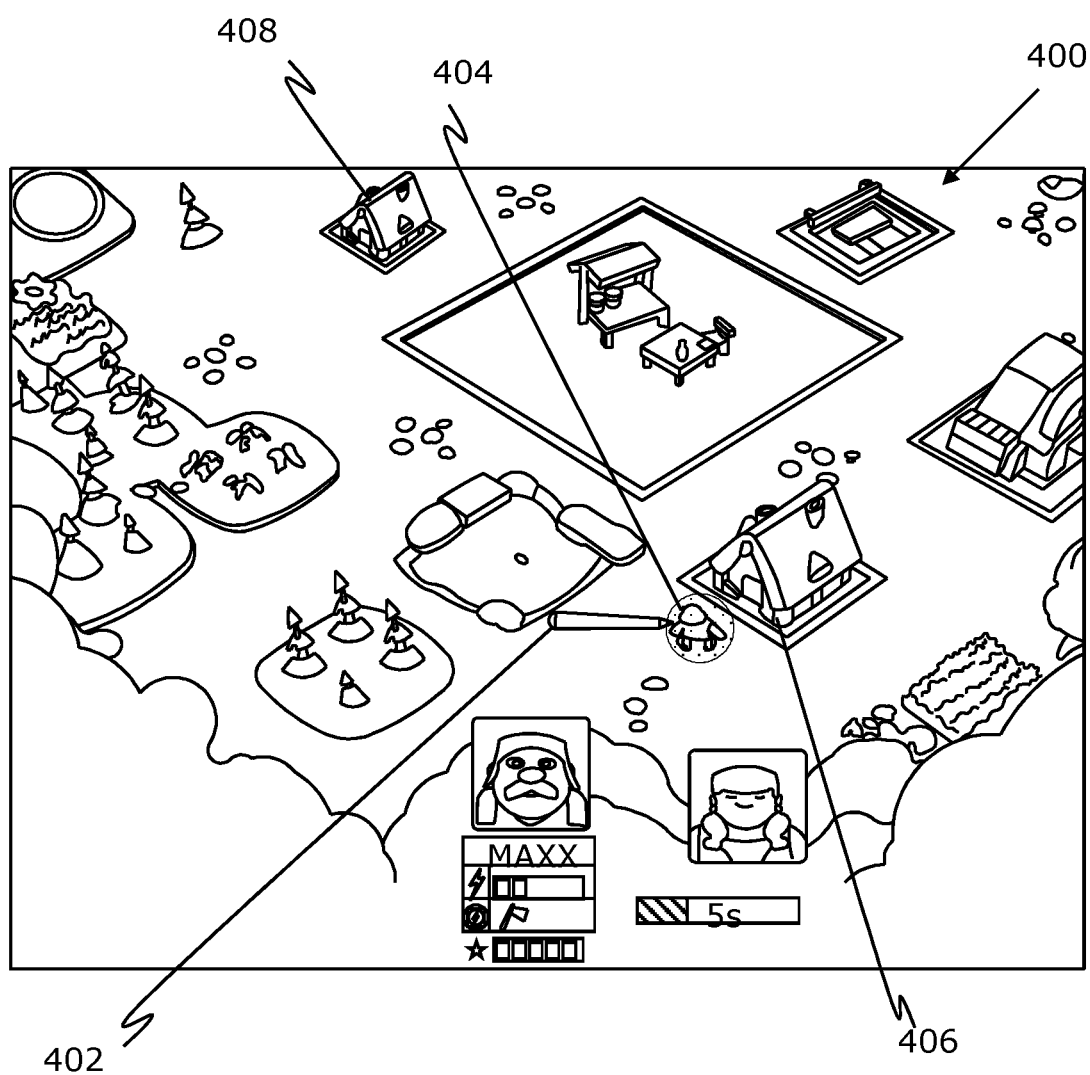
FIGS. 4A-4D are graphical representations of a game field around a home area of an active user depicting successively the steps involved in allocation of a job related to a target object to a character object as rendered on the display of the computing device, in accordance with various embodiments of the present disclosure.

Referring to FIG. 4A, there is shown a graphical representation of a game field 400 around a home area (such as, the home area 202) of an active user (like the user A), in accordance with an embodiment of the present disclosure. In particular, FIG. 4A depicts selection by a pointer device 402 of a first character 404 on a display (such as the display 108 of FIG. 1) of a computing device (such as the computing device 102 of FIG. 1). As illustrated, the first character 404 is rendered next to a first target object 406 (a first house), which is notably the initial position of the first character object 404. A pointer device 402 (like tip of a finger) is used to apply pressure on an area of the display of the computing device, where the first character 404 is rendered. The first character 404 is selected to be controlled or moved to a second target object 408. In some examples, as illustrated, the first character 404 is also highlighted upon selection thereof.

Figure 4B:
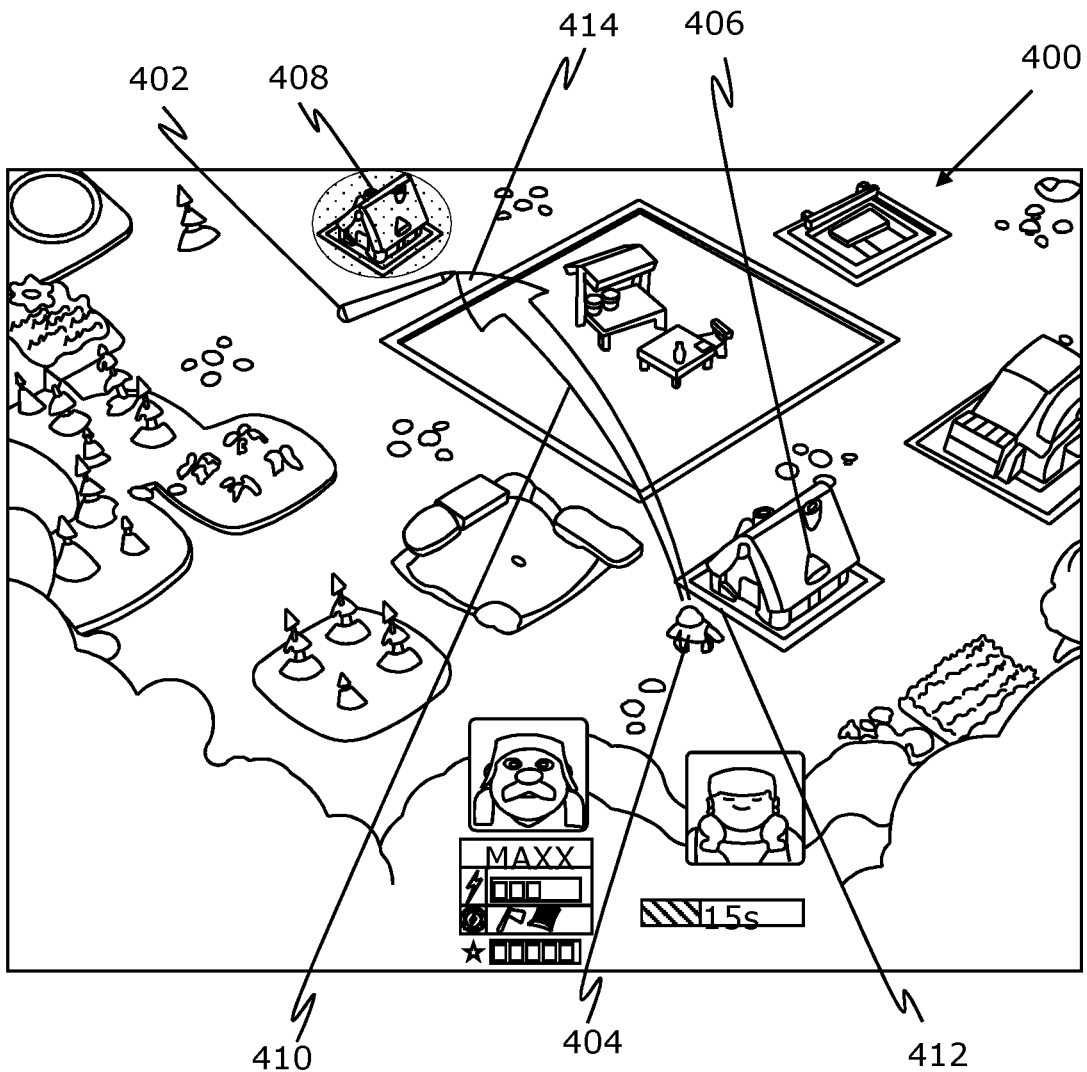

Referring to FIG. 4B, there is shown a graphical representation of the game field 400 around the home area of the active user, in accordance with an embodiment of the present disclosure. In particular, FIG. 4B depicts a movement of the pointer device 402 towards the second target object 408 (over the display) while maintaining the selection of the first character 404. Herein, the pointer device 402 is moved along the display without releasing the applied pressure and while maintaining the movement. An indicator 410 (here, an arrow) is presented on the display while the pointer device 402 is in a selecting state and being moved by applying pressure. Notably, an origin 412 of the indicator 410 is disposed at an initial position (near the first target object 406) of the first character 404 on the display. The end of the indicator 410 comprises a directional shape 414 (depicted as an arrow-head). Further, the directional shape 414 is configured to follow the pointer device 402 as it is moved from the initial position on the display. In an example, as the pointer device 402 is moved, the directional shape 414 of the indicator 410 is modified in such a way that the directional shape 414 of the indicator 410 follows the pointer device 402.

Notably, the indicator 410 can be long or short and can point to any direction from the first character 404. Furthermore, the pointer device 402 can be moved in all directions on the display to select a desired target object. When the directional shape (arrow-head) 414 of the indicator 410, points at a particular target object, the target object is highlighted indicating selection. As shown, the directional shape (arrow-head) 414 of the indicator 410 points at the second target object 408. The second target object 408 is highlighted to indicate that it has been selected by the user. Furthermore, the second target object 408 is highlighted only when the pointer device 402 is within a predetermined distance of the second target object 408. Notably, the first character 404 is not set into motion from the initial position until the pressure is released from the display of the computing device. In the present example, the second target object 408 is a house to be upgraded to next level.

Figure 4C:
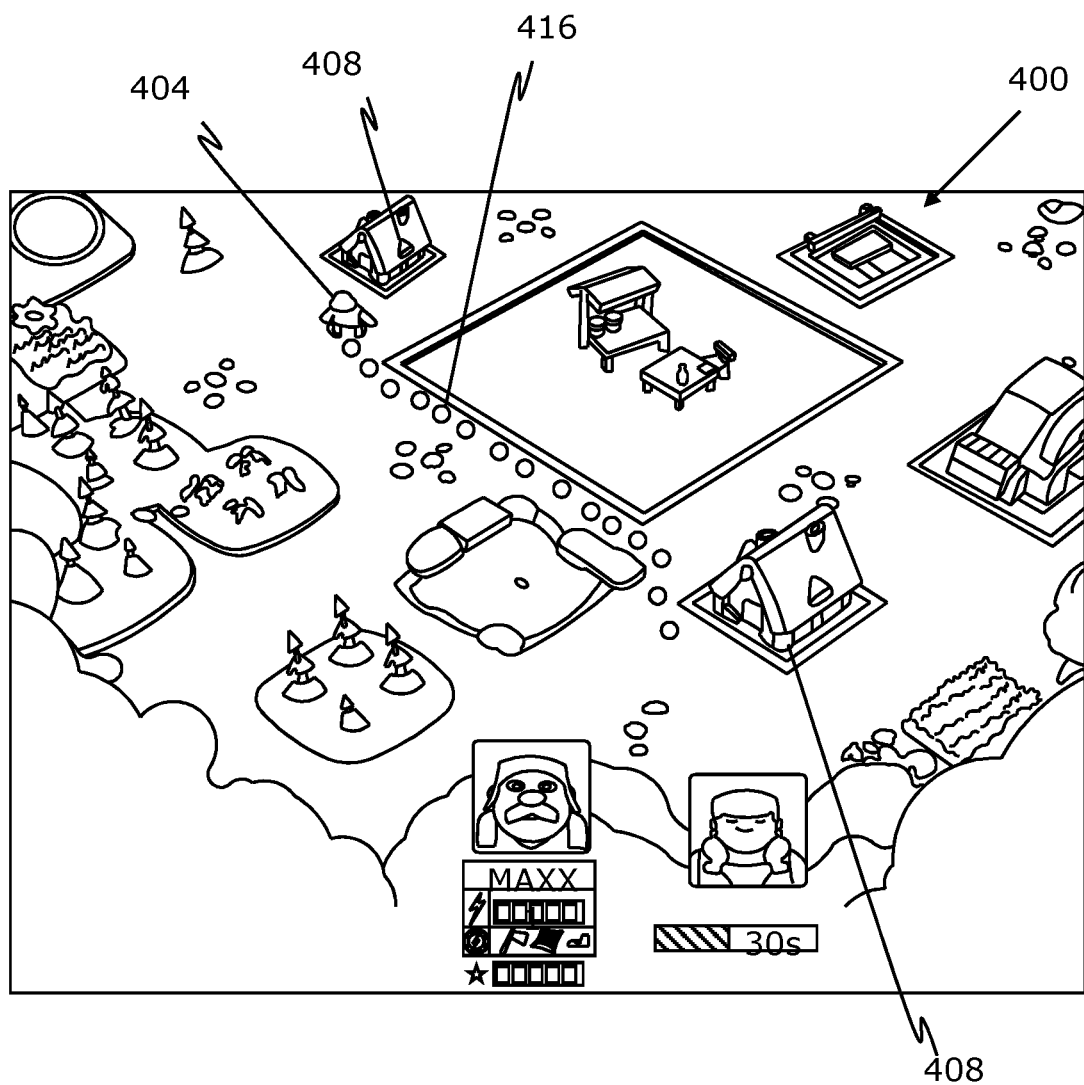

Referring to FIG. 4C, there is shown a graphical representation of the game field 400 around the home area of the active user, in accordance with an embodiment of the present disclosure. In particular, FIG. 4C depicts a movement of the first character 404 towards the second target object 408 on the display when the pointer device 402 is released. As shown, the user interface represents a final position of the first character 404 via a path 416 after the pointer device 402 is released. When the pressure is released from the display, the first character 404 is set into motion and follows the path 416. As shown, the first character 404 is rendered next to the second target object 408 following the path 416. Notably, a job associated with the second target object 408 is assigned to the first character 404. It may be appreciated that the time required by the first character 404 to move from the first target object 406 to the second target object 408 may be dependent on a characteristic of the first character 404 and/or the game play.

Figure 4D:
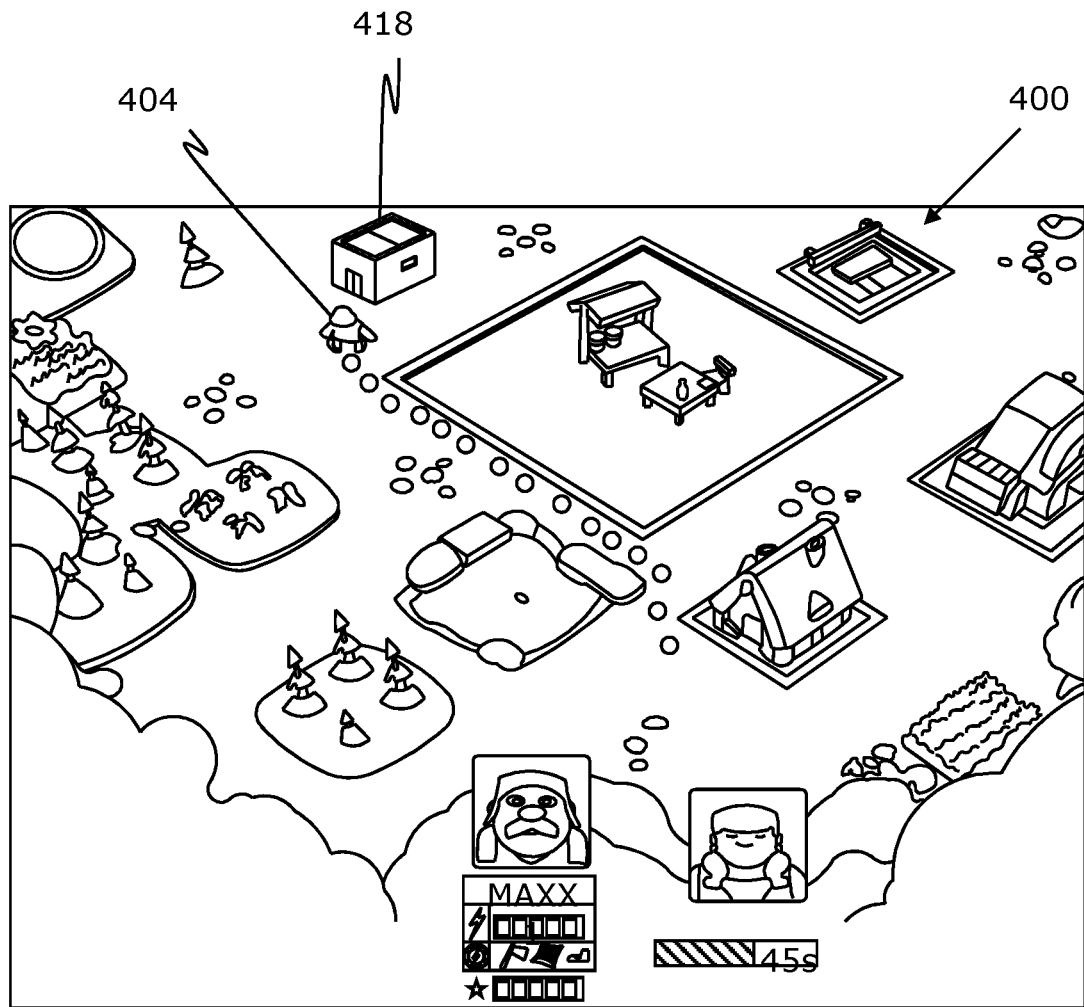

Referring to FIG. 4D, there is shown a graphical representation of the game field 400 around the home area of the active user, in accordance with an embodiment of the present disclosure. In particular, FIG. 4C depicts an upgraded second target object 418 (house) after the execution of the assigned job by the first character 404 by updating a presentation thereof. As shown, the upgraded second target object 418 generally covers a larger structural area, an improved structural design depicting the upgradation of the second target object 408 (of FIG. 4C) to the upgraded second target object 418.

Figure 5A:
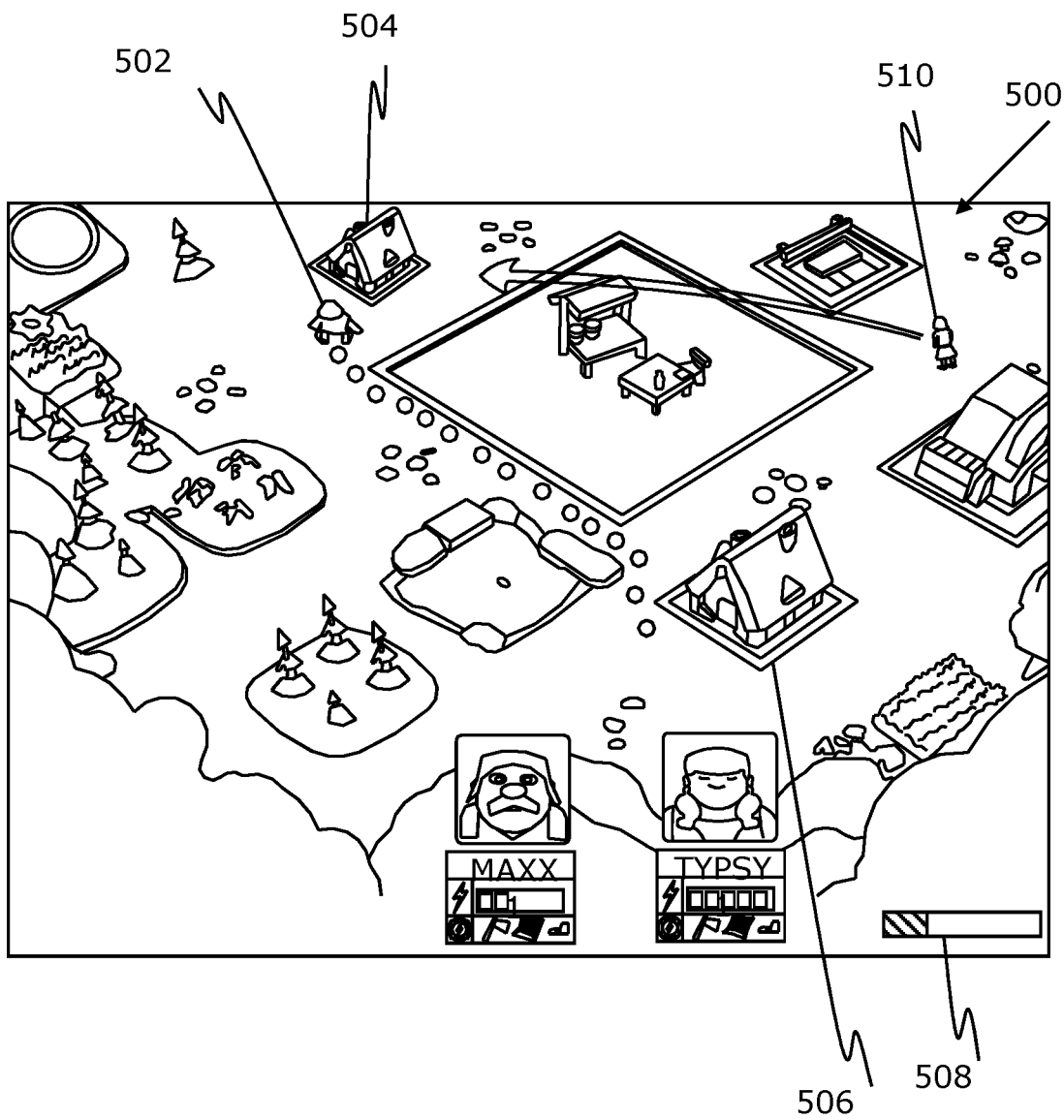
FIGS. 5A-5B are graphical representations of a game field depicting successively the steps involved in cumulative allocation of a job related to a target object to a first character and at least one other character as rendered on the display of the computing device, in accordance with various embodiments of the present disclosure.

Referring to FIG. 5A, there is shown a graphical representation of a game field 500 around the home area of the active user, in accordance with an embodiment of the present disclosure. In particular, FIG. 5A depicts movement of the first character 502 towards the second target object 504, from the first target object 506 on the display, for execution of a job related to the second target object 504. In an example, the time consumed by the first character 502 to execute the given job related the second target object 504 may be, for example, 60 seconds with its skill level. The timer device 508 represents that the first character 502 has already consumed about 10 seconds. Therefore, the first character 502 will require an additional 50 seconds to execute the job related to the second target object 504. Further, at least one other character 510 (hereinafter, sometimes, referred to as second character 510) is assigned the same job related to the second target object 504 to accelerate the job execution, thereby reducing the total amount of time required for completion of the job.

Figure 5B:
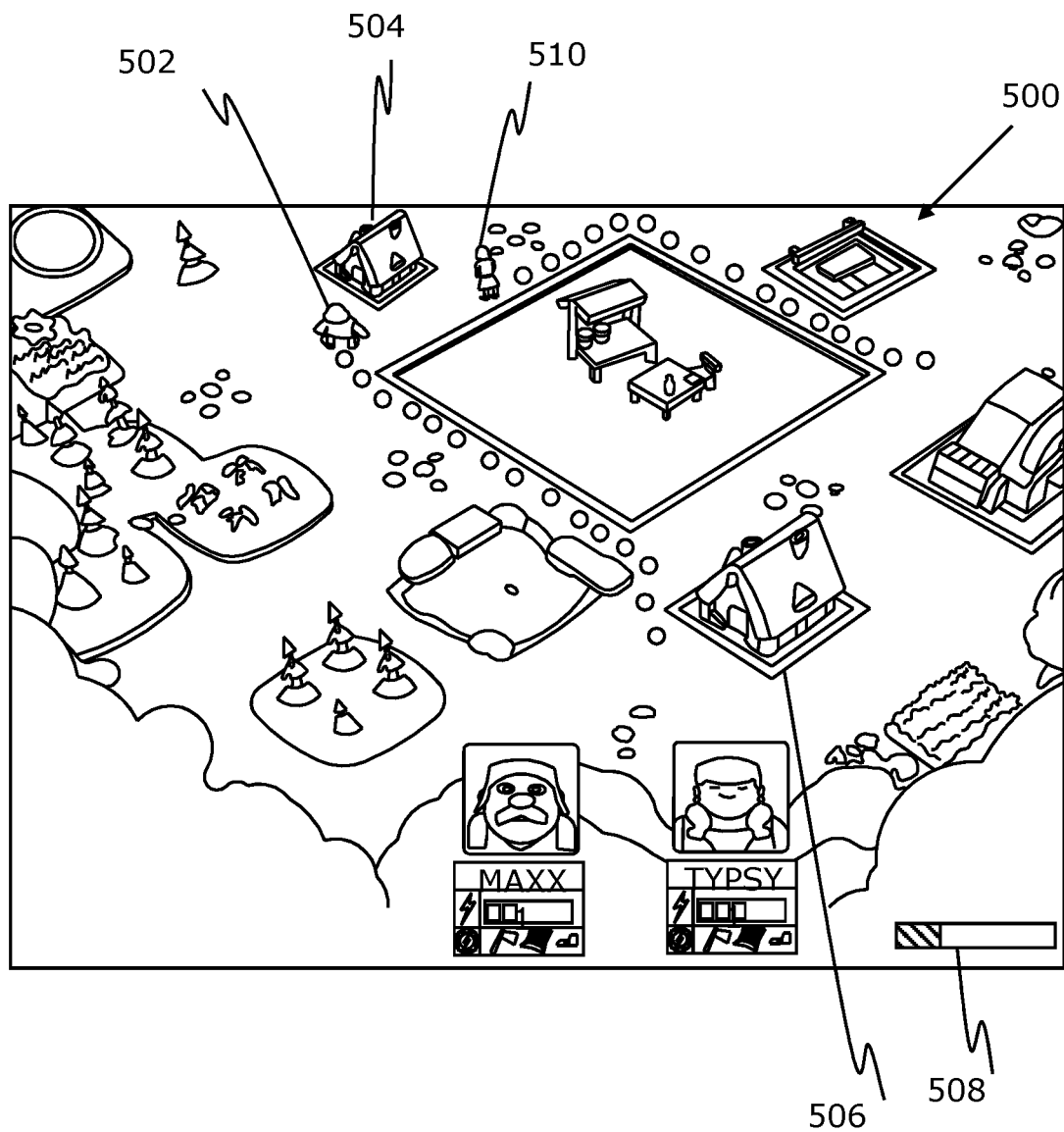

Referring to FIG. 5B, there is shown a graphical representation of the game field 500 around the home area of the active user, in accordance with an embodiment of the present disclosure. In particular, FIG. 5B depicts execution of the job of updating the second target object 504 by the second character 510, in addition to the first character 502, to accelerate the completion of the job related to the second target object 506. In an example, the second character 510 may have the same skill level as the first character 502. Therefore, the first character object 502 and the second character 510 together may complete the job in 25 seconds, instead of 50 seconds needed by the first character 502.

Figure 6:
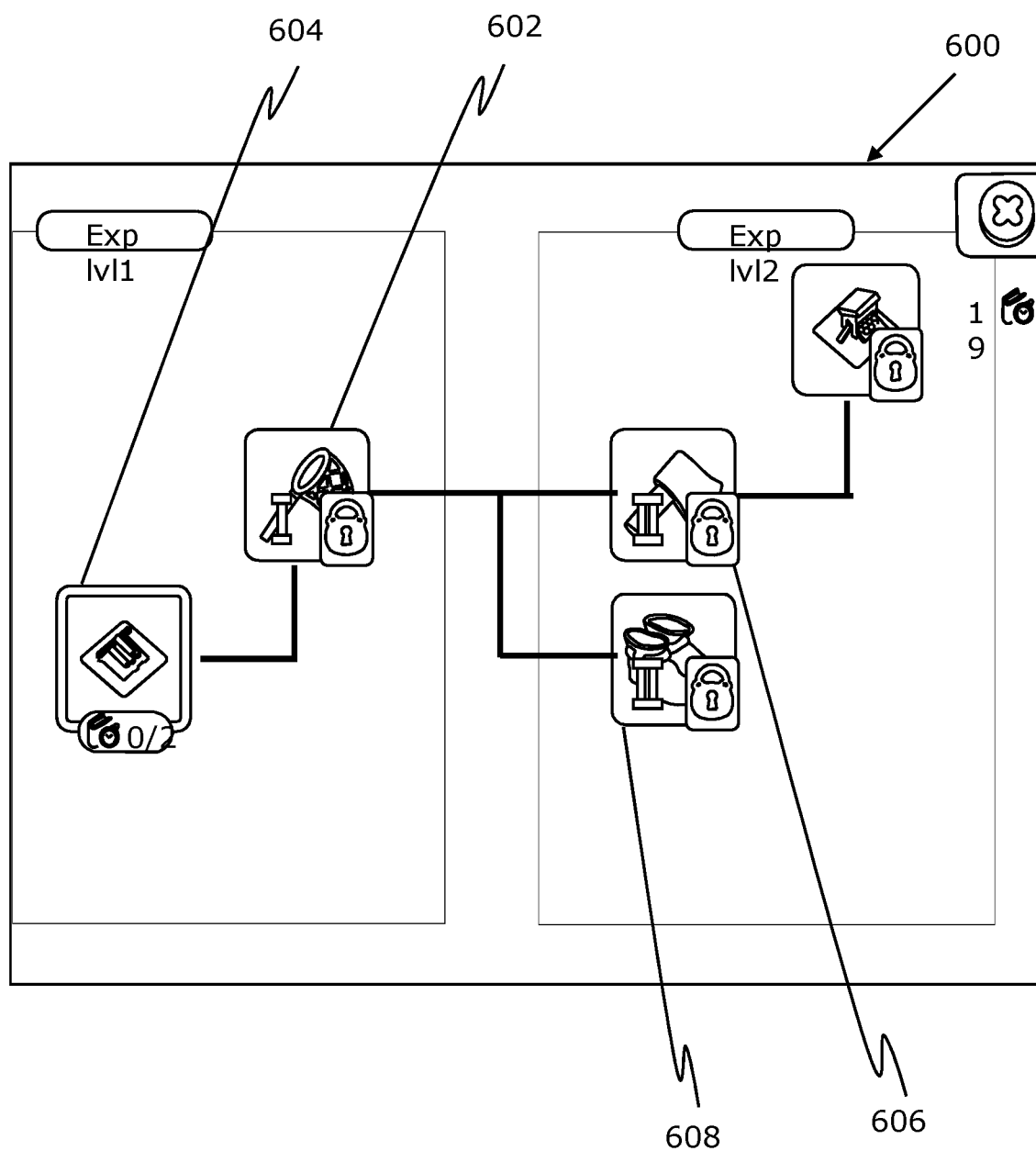
FIG. 6 is a graphical illustration of a user interface rendering a skill level tree to be unlocked by character objects, in accordance with an embodiment of the present disclosure.

Referring to FIG. 6, there is shown a schematic illustration of user interface rendering a skill level tree 600 to be unlocked by the characters during the course of the game, in accordance with an embodiment of the present disclosure. As shown, the skill of using a hand net 602 is locked. As soon as the home area associated with a user has cumulatively unlocked the tool of hand net 602, the hand net 602 is available for all character objects of the corresponding home area to perform the action of fishing in a resource object, such as a fish pond in a more efficient manner. In an example, the skill level for the fishing activity may be improved with unlocking of the hand net 602 for each of the character objects having access to the hand net 602. Similarly, a skill of farming 604, a skill of using axe 606, a skill of using boots 608 are locked in a particular level. As soon as the levels upgrade, the respective skills are unlocked and are available to the character objects for utilization. In an example skill of using boots 608 or using axe 606 can not unlocked before previous level skill of using hand net 602 is unlocked.

Figure 7:
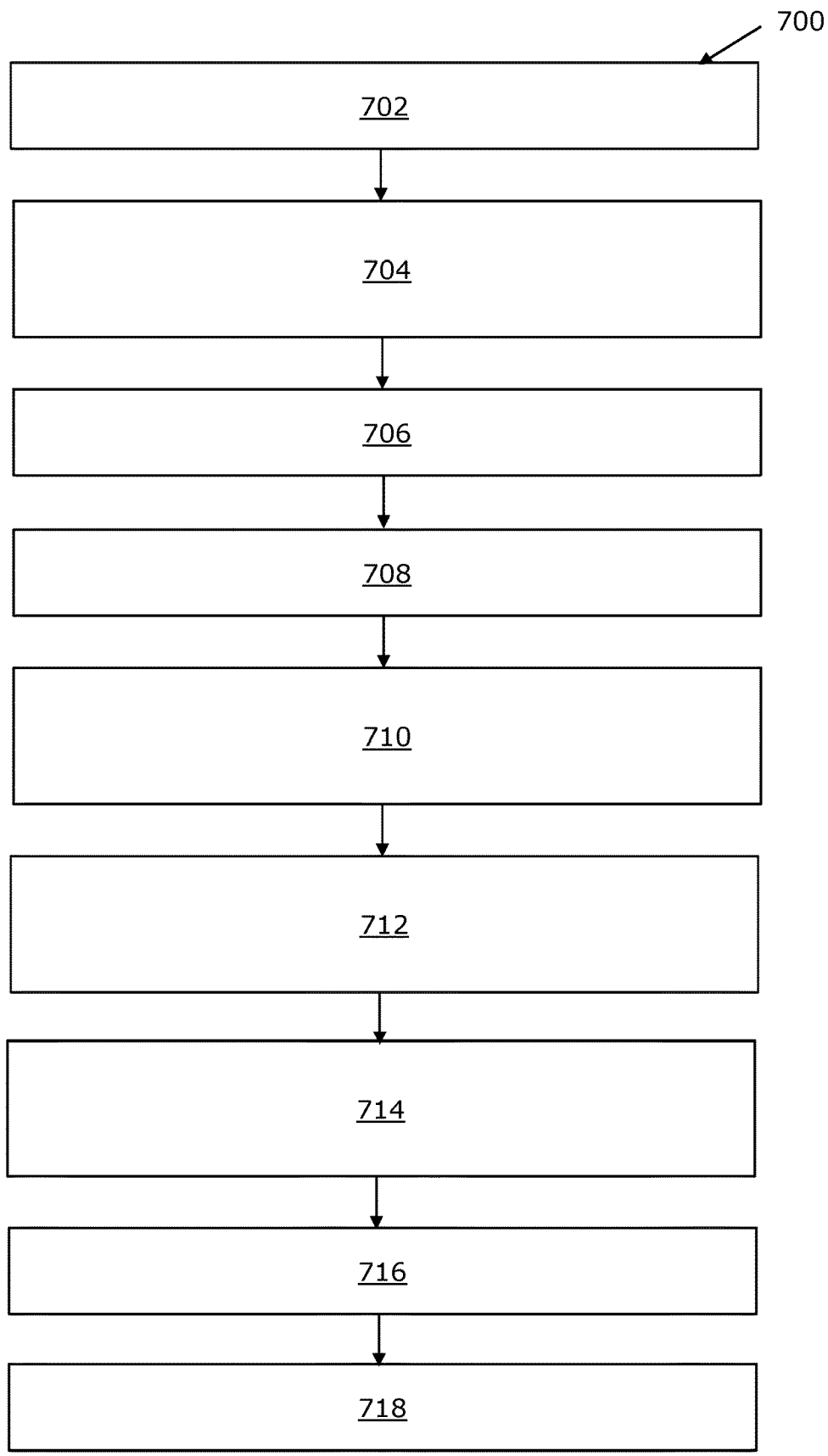
FIG. 7 is an illustration of a flowchart of a method for facilitating user interactions in a gaming environment, in accordance with an embodiment of the present disclosure.

Referring to FIG. 7, there is shown a flowchart of a method 700 for facilitating user interactions in a gaming environment, in accordance with an embodiment of the present disclosure. At step 702, a selection by a pointer device of a first character on a display of a computing device is detected. At step 704, a movement of the pointer device on the display towards a target object on the display while maintaining the selection of the first character is detected. At step 706, an indicator on the display while the pointer device is in a selecting state and being moved is presented. An origin of the indicator is disposed at an initial location of the first character on the display and extending toward an end of the movement of the first character or a current position of the first character, the end of the indicator comprising a directional shape. The directional shape is configured to follow the pointer device as it is moved from the initial position on the display. At step 708, it is detected that the pointer device is within a predetermined distance of the target object. At step 710, whether a job to be executed with respect to the target object is capable of being executed by the first character is determined. At step 712, the target object on the display when the pointer device is within the predetermined distance and the first character is capable of executing the job is highlighted. At step 714, the first character to the target object when the selecting by the pointer device is released and the pointer device is within the predetermined distance is assigned. At step 716, the first character is caused to execute the job with respect to the target object. At step 718, a presentation of the target object on the display to present a result of the executed job is updated.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A computer implemented method, comprising:
   detecting a selection by a pointer device of a first character on a display of a computing device;
   detecting a movement of the pointer device on the display towards a target object on the display while maintaining the selection of the first character;
   presenting an indicator on the display while the pointer device is in a selecting state and being moved, an origin of the indicator being disposed at an initial location of the first character on the display and extending toward a current position of the pointer device after being moved, the end of the indicator comprising a directional shape, wherein the directional shape is configured to follow the pointer device as it is moved from the initial position on the display;
   detecting that the pointer device is within a predetermined distance of the target object;
   determining whether a job to be executed with respect to the target object is capable of being executed by the first character;
   highlighting the target object on the display when the pointer device is within the predetermined distance and the first character is capable of executing the job;
   assigning the first character to the target object when the selecting by the pointer device is released and the pointer device is within the predetermined distance;
   causing the first character to execute the job with respect to the target object; and
   updating a presentation of the target object on the display to present a result of the executed job.

2. The computer implemented method according to claim 1, wherein assigning the first character to execute the action comprises causing the first character to reposition from the initial location to a position near the target object.

3. The computer implemented method according to claim 2, wherein causing the first character to execute the action further comprises causing the first character to reposition from the target object to a resource object, the resource object being configured to provide resources for the first character to execute at least one task of the job at the target object.

4. The computer implemented method according to claim 3, further comprising causing the first character to retrieve at least one resource related to the job from the resource object and transport the at least one resource from the resource object to the target object.

5. The computer implemented method according to claim 4, further comprising causing the first character to execute at least a portion of the job with respect to the target object with the at least one resource.

6. The computer implemented method according to claim 5, further comprising causing the first character to return to the resource object to retrieve at least one other resource from the resource object if the job to be executed is not complete.

7. The computer implemented method according to claim 1, further comprising causing the first character to relocate to a base object periodically from the target object while executing the job.

8. The computer implemented method according to claim 1, further comprising presenting a timer device on the display, the timer device being configured to present an elapsed time of execution of the job.

9. The computer implemented method according to claim 1, wherein the job comprises a predetermined number of tasks, and wherein a task of the predetermined number of tasks is configured to require a predetermined amount of time.

10. The computer implemented method according to claim 9, wherein the first character has a predefined skill level, the predefined skill level defining a first time required for the first character to complete a task of the job.

11. The computer implemented method according to claim 10, further comprising increasing a skill level of the first character, wherein increasing the skill level of the first character causes the first character to perform the task in a second time, the second time being less than the first time.

12. The computer implemented method according to claim 8, further comprising increasing a speed with which the first character is configured to execute the task when the first character acquires a predetermined resource from the resource object.

13. The computer implemented method according to claim 1, further comprising causing the first character to transport at least one item that is a result of a task to a storage object.

14. The computer implemented method according to claim 13, further comprising causing the first character to retrieve an item from the storage object and transport the item to a second target object and causing the first character to execute an action on the second target object with the item, wherein a presentation of the second target object is updated on the display to reflect the executed action.

15. The computer implemented method according to claim 1, further comprising:
detecting a selection by a pointer device of at least one other character on the display of the computing device;
detecting a movement of the pointer device on the display towards the target object on the display while maintaining the selection of the at least one other character;
presenting an indicator on the display while the pointer device is in the selecting state and being moved, an origin of the indicator being disposed at an initial location of the at least one other character on the display and extending toward an end, the end of the indicator comprising a directional shape, wherein the directional shape is configured to follow the pointer device as it is moved from the initial location of the at least one other character on the display;
detecting that the pointer device is within the predetermined distance from the target object;
determining whether the at least one other character is capable of executing a task for the job related to the target object;
highlighting the target object on the display when the pointer device is within the predetermined distance and the task is capable of being executed by the at least one other character;
assigning the at least one other object to the target object when the selecting by the pointer device is released and the pointer device is within the predetermined distance; and
causing the at least one other character to execute the task with respect to the target object.

16. The computer implemented method according to claim 15, wherein the task executed by the first character and the task executed by the at least one other character are cumulatively executed with respect to the target object.

17. The computer implemented method according to claim 16, wherein the task executed by the first character is different from the task executed by the at least one other character.

18. The computer implemented method according to claim 15, wherein the first character is configured to execute and complete a first task for the target object within a first predetermined time period and the at least one other character is configured to execute and complete a second task for the target object within a second predetermined time period.

19. The computer implemented method according to claim 1, wherein updating the presentation of the target object on the display to present a result of the executed job further comprises:
determining that a predetermined number of tasks of the job have been executed; and
updating the presentation of the target object from a first level to a second level when the predetermined number of tasks are completed within a predetermined time period for the job.

20. A computing device, comprising:
a display; and
a computing hardware operable to execute a software product, wherein executing the software product results in generating and rendering a graphical user interface on the display, the graphical user interface being configured to facilitate user interactions, the computing hardware, the software product and the graphical user interface being implemented in a gaming environment to:
detect a selection by a pointer device of a first character on the display;
detect a movement of the pointer device on the display towards a target object on the display while maintaining the selection of the first character;
present an indicator on the display while the pointer device is in a selecting state and being moved, an origin of the indicator being disposed at an initial location of the first character on the display and extending toward a current position of the pointer device after being moved, the end of the indicator comprising a directional shape, wherein the directional shape is configured to follow the pointer device as it is moved from the initial position on the display;
detect that the pointer device is within a predetermined distance of the target object;
determine whether a job to be executed with respect to the target object is capable of being executed by the first character;
highlight the target object on the display when the pointer device is within the predetermined distance and the first character is capable of executing the job;
assign the first character to the target object when the selecting by the pointer device is released and the pointer device is within the predetermined distance;
cause the first character to execute the job with respect to the target object; and
update a presentation of the target object on the display to present a result of the executed job.

* * * * *